UNITED STATES PATENT OFFICE.

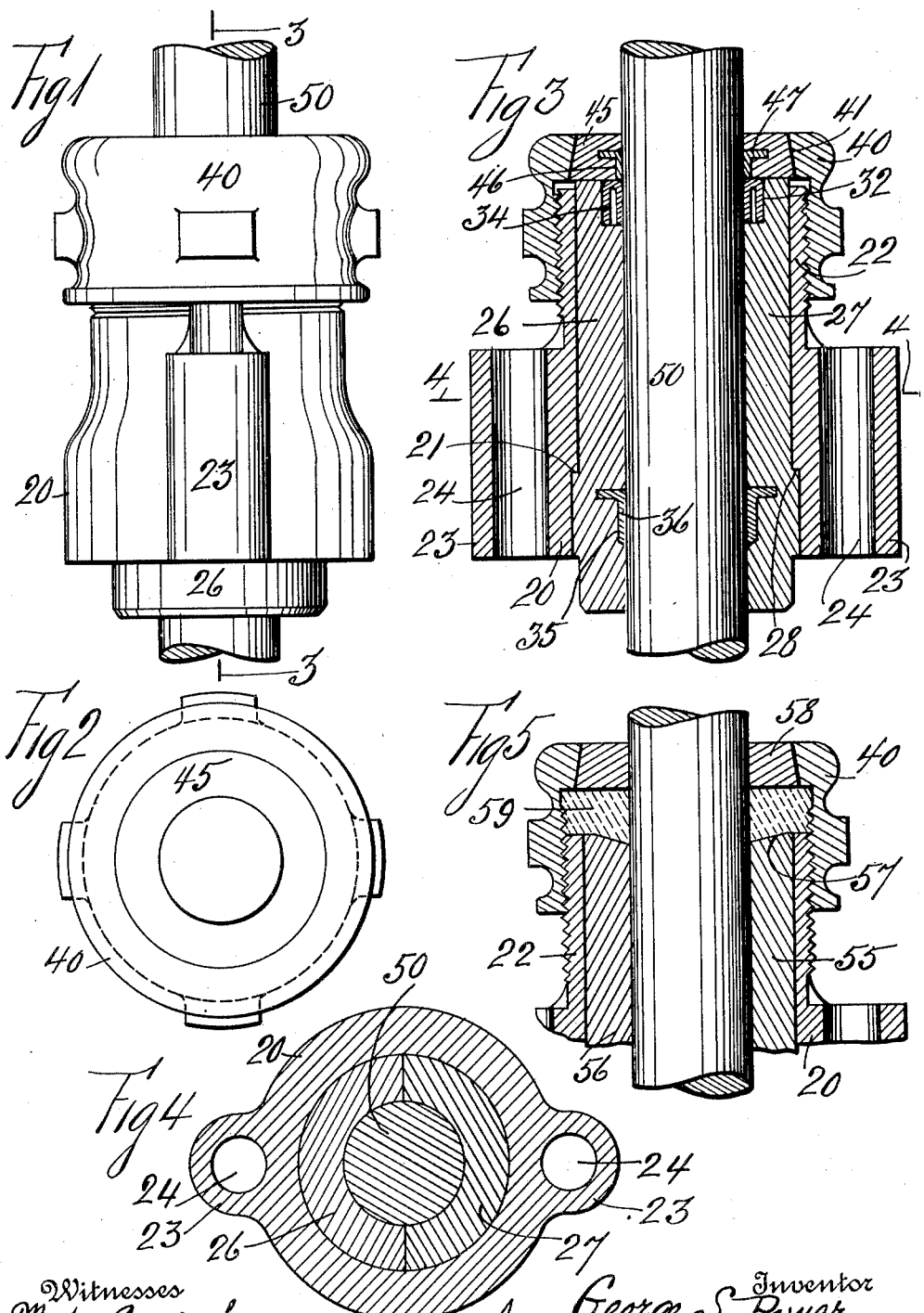

GEORGE S. POWER, OF NUTLEY, NEW JERSEY.

FRONT END FOR CYLINDERS.

1,009,787.    Specification of Letters Patent.    Patented Nov. 28, 1911.

Application filed August 10, 1909. Serial No. 512,112.

*To all whom it may concern:*

Be it known that I, GEORGE S. POWER, a citizen of the United States, and resident of Nutley, in the county of Essex and State of New Jersey, have invented certain new and useful Improvements in Front Ends for Cylinders, of which the following is a specification.

This invention relates to a front end for a rock drill cylinder and the like.

It is characterized by a bushing which is split so that it can be easily removed from its piston rod without requiring the said head to be made in halves. The smallest outer diameter of the bushing is somewhat greater than the largest diameter of the piston or piston rod, so that the head when the bushing is removed therefrom can be slipped over either the piston rod or piston.

In the accompanying drawing Figure 1 represents a front elevation of a front end of a rock drill cylinder exemplifying the invention, Fig. 2 shows a top plan view of Fig. 1, Fig. 3 is a partial section of Fig. 1 on the line 3, 3, Fig. 4 represents a section as on the line 4, 4 of Fig. 3, and Fig. 5 shows a partial axial section of a modification of the invention.

A head 20 is represented with the shoulder 21 on the inner cylindrical surface thereof, and the outer threaded end 22. Lugs 23 having the openings 24 are formed with the head.

The head is bolted in position on its cylinder not shown, by means of bolts not shown, which latter pass through the openings 24. A split bushing with the members 26 and 27 shouldered at 28 is located in the head, the shoulder 28 registering with the shoulder 21. If the head is to be used for an air cylinder, annular pockets 32 may be formed in the members of the split bushing for the U shaped packing 34, as also the annular pockets 35 for the flange packing 36.

A cap 40 is in threaded engagement with the threaded end 22 of the head 20, and it has a tapered opening 41. A tapered gland 45 registers with the tapered opening 41 and if used for an air cylinder may have the annular pocket 46 for the flanged packing ring 47. A piston rod 50 is shown in the gland. The U packing 34 or the flange packing 36 may be omitted, one only being used.

In the modification shown in Fig. 5, which is used for a steam cylinder, the head 20 is represented with the threaded end 22, and a split bushing with the members 55 and 56, similar to the members 26 and 27 is located within said head. It contains no annular pockets for packing but has an inclined upper edge 57. A gland 58 is held in the cap 40 and packing 59 is interposed between the edge 57 of the split bushing and the lower surface of the gland 58.

Having described my invention what I desire to secure by Letters Patent and claim is:

1. In a front end for a cylinder the combination of a head, a shoulder formed in the bore of said head, a piston rod in the head, a split bushing located in said head and surrounding said rod, a shoulder on the bushing registering with the shoulder of the bore of the head, an annular pocket formed on the inner surface of the members of the bushing, a packing ring in said pocket to pack the piston rod, a cap in threaded engagement with said head and having an inner beveled surface, a gland concentric with said bushing having an outer beveled surface registering with the beveled surface of the cap and bearing on said bushing.

2. In a front end for a cylinder the combination of a head, a piston rod extending through the head, a split bushing in the bore of said head, an annular pocket formed on the inner surface of the members of the bushing, a packing in said pocket to pack the piston rod, a cap in engagement with said head, a gland surrounding the piston rod located between said cap and bushing.

3. In a front end for a cylinder the combination of a head, a piston rod extending through the head, a split bushing in the bore of said head, an annular pocket formed on the inner surface of the members of the bushing, a packing in said pocket to pack the piston rod, a cap for the head, a gland surrounding the piston located between said cap and bushing, an annular pocket on the inner surface of the gland and a packing ring in the latter pocket.

Signed at the borough of Manhattan in the county of New York and State of New York this 6th day of August A. D. 1909.

GEORGE S. POWER.

Witnesses:
A. A. DE BONNEVILLE,
MARTIN ZIMANSKY.